June 17, 1958 E. B. STEPHENSON ET AL 2,838,850
VIRTUAL TARGET FOR ECHO RANGING APPARATUS
Filed Sept. 15, 1943 3 Sheets-Sheet 1
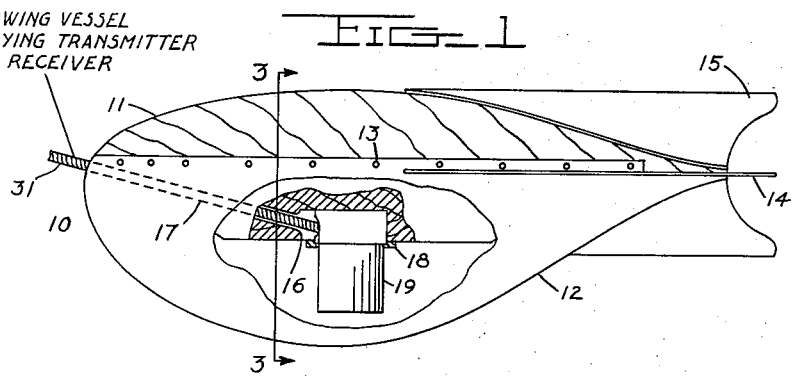
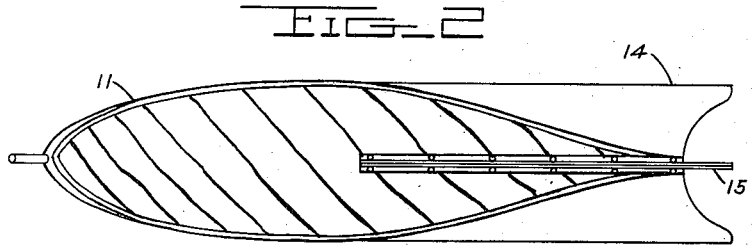
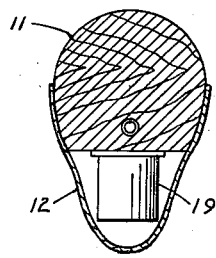
Inventors
EDWARD B. STEPHENSON.
HORACE M. TRENT.
JAMES R. RICHARDS.
By *S. E. Bush*
Attorney June 17, 1958  E. B. STEPHENSON ET AL  2,838,850
VIRTUAL TARGET FOR ECHO RANGING APPARATUS
Filed Sept. 15, 1943  3 Sheets-Sheet 2
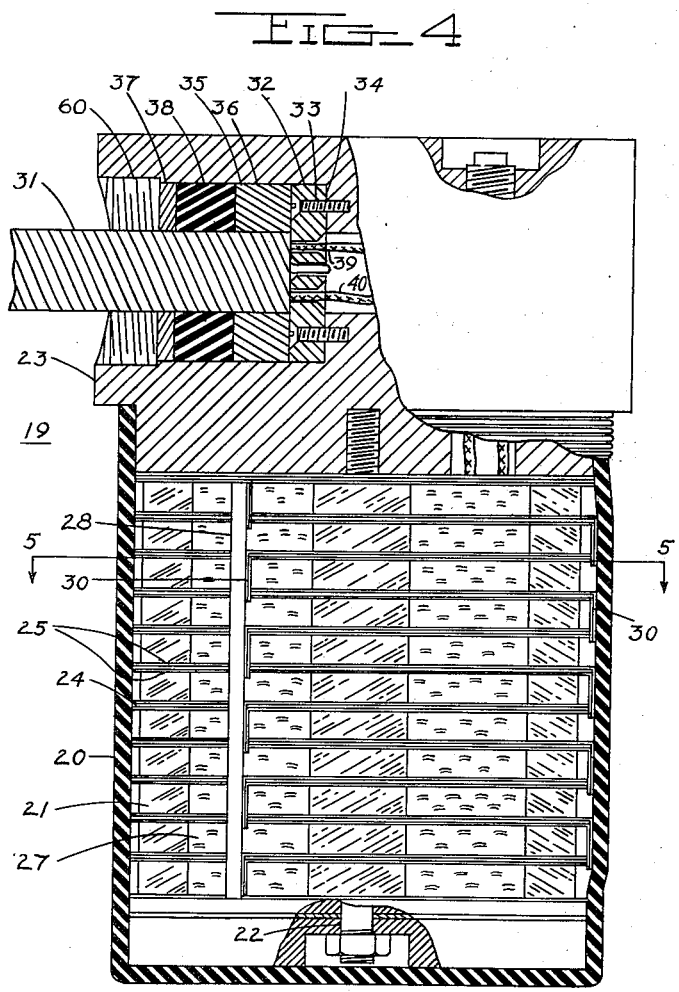
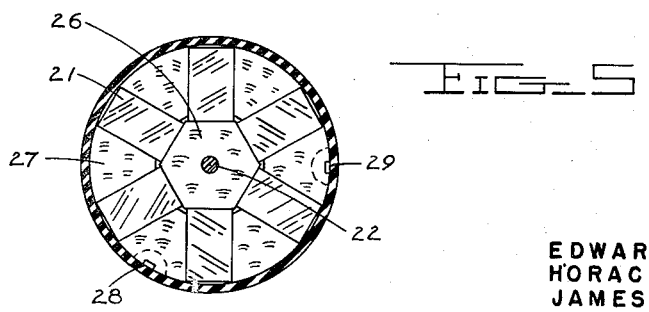
Inventors
EDWARD B. STEPHENSON.
HORACE M. TRENT.
JAMES R. RICHARDS.

June 17, 1958 E. B. STEPHENSON ET AL 2,838,850
VIRTUAL TARGET FOR ECHO RANGING APPARATUS
Filed Sept. 15, 1943 3 Sheets-Sheet 3
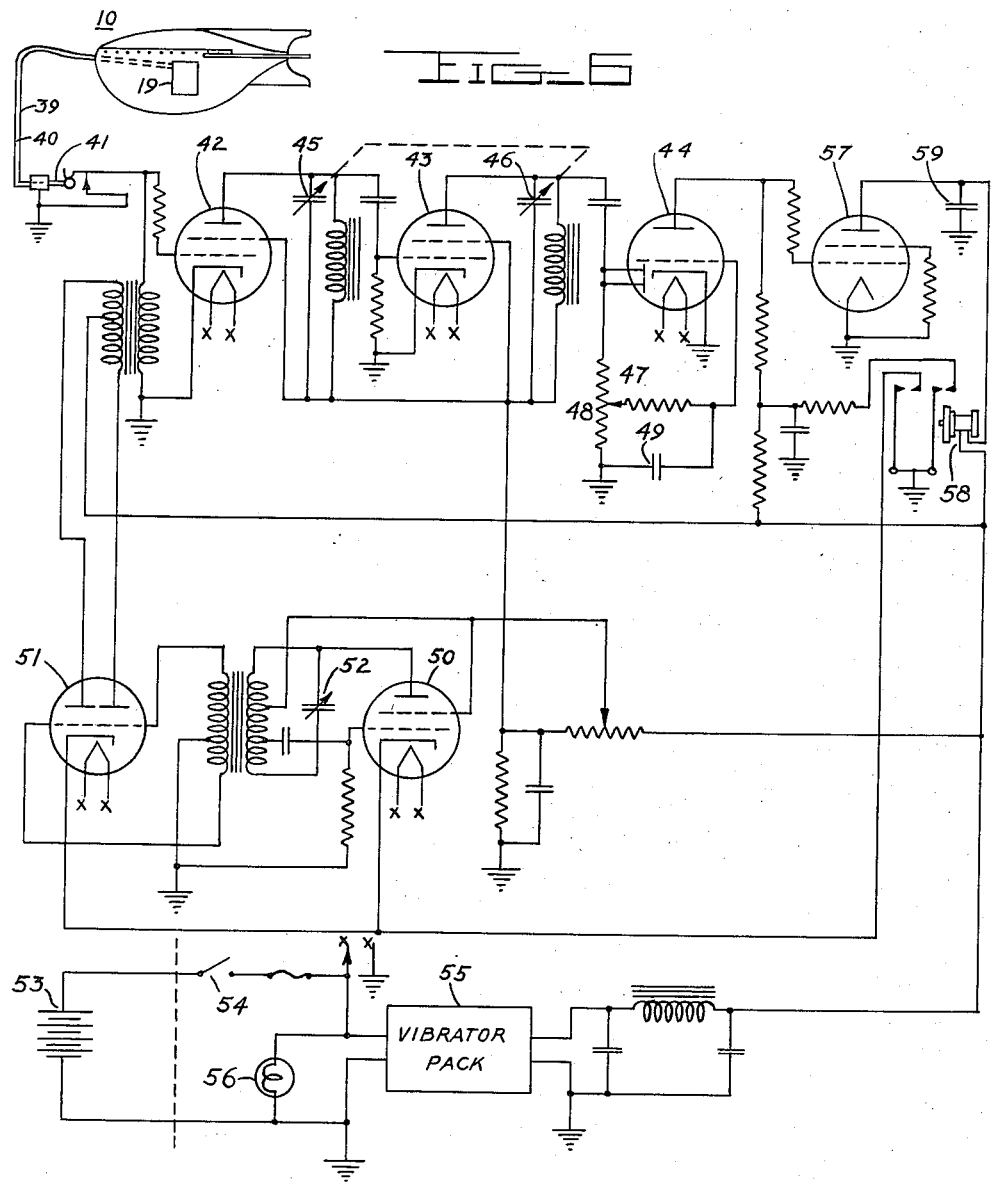
Inventors
EDWARD B. STEPHENSON.
HORACE M. TRENT.
JAMES R. RICHARDS.
By United States Patent Office 2,838,850
Patented June 17, 1958

2,838,850

VIRTUAL TARGET FOR ECHO RANGING APPARATUS

Edward B. Stephenson, Washington, D. C., Horace M. Trent, Alexandria, Va., and James R. Richards, Fort Washington, Md.

Application September 15, 1943, Serial No. 502,549

3 Claims. (Cl. 35—25)

(Granted under Title 35, U. S. Code (1952), sec. 266)

The invention described herein may be manufactured and used by or for the Government of the United States of America for governmental purposes without the payment of any royalties thereon or therefor.

This invention relates generally to sound signalling, and in particular to the art of determining the bearing and distance from a supersonic sound source to an object by the echo technique and often referred to as "echo ranging."

In apparatus of this kind, a compressional wave of supersonic frequency is emitted from a projector which may be of either the magnetostrictive or piezoelectric crystal type. Because of the design of the projector, the sound wave may be beamed in any desired direction. When the wave strikes an object, it is reflected and the "echo" travels back to the source of the sound.

The bearing of the object target is indicated by the bearing of the projector and the range is computed from the time required by the wave to travel from the source to the target and back again. This method is well known and is particularly useful under water for detecting submarines and other vessels.

However, in apparatus of this kind, it is well known that the intensity of the echo wave reflected by the object varies with the size of the object and therefore unless the intensity of the transmitted wave striking a comparatively small target is very high, the intensity of the echo wave will not be sufficient to effect a clear detection thereof at the source of the transmitted wave.

It is therefore, an object of our invention to provide for obtaining a clearly receivable echo of a pulse of supersonic compressional wave energy from a comparatively small object target.

A more specific object is to provide apparatus in which a pseudo echo is produced at the object target and which will be of ample intensity to effect clear reception thereof at the source of the transmitted wave pulse.

Furthermore, in the training of personnel in the use of echo ranging apparatus of the class described for locating targets under water, such for example, as submarines, it has been necessary up to the present time to use an actual submarine since existing echo ranging equipment is not capable of detecting echoes at a considerable range from any much smaller objects.

However, by means of our invention, it is now possible to substitute a much smaller body which is adapted to be submerged in lieu of the submarine, the body containing or otherwise supporting a transducer which is responsive upon the receipt of a pulse of supersonic wave energy from the echo ranging apparatus to send back a pseudo echo of such intensity as to be clearly detectable at the location of the echo ranging apparatus.

It should be evident that a device embodying our invention, which eliminates the need for use of an actual submarine in training personnel in the operation of echo ranging systems, effects a considerable saving both in the personnel and in equipment involved for such training.

Other objects of the invention will become apparent from the detailed description to follow and the accompanying drawings which illustrate a preferred embodiment of the invention as applied to underwater use.

In the drawings, in which like reference characters indicate like parts,

Fig. 1 is a side elevation partly in section of the target which is adapted to be towed under water;

Fig. 2 is a top plan view of the device shown in Fig. 1;

Fig. 3 is a sectional view taken on lines 3—3 of Fig. 1;

Fig. 4 is an enlarged elevational view partly in section of the transducer contained within the target with a portion of the casing removed;

Fig. 5 is a sectional view taken on lines 5—5 of Fig. 4 but at a reduced scale; and Fig. 6 is a circuit diagram of the receiver and transmitter or driver associated with the transducer.

Referring now to the drawings and in particular to Fig. 1, the numeral 10 designates a streamlined target or body member which is adapted to be towed beneath the surface of the water in simulation of a submarine. The target 10 includes a main body portion 11 which is made of wood, suitably streamlined, and a lower metallic shell like housing 12 which is attached to the body 11 by any suitable means such as screws 13.

In order to stabilize the motion of the target 10 through the water, horizontal and vertical fins 14 and 15, respectively, may be provided, and suitable ballast (not shown) may be used to establish a desired degree of buoyancy.

The juncture between the lower shell 12 and the upper wood body portion 11 should not be made airtight thereby permitting the inner hollow portion of the shell 12 to flood as the target 10 is submerged in the water so that the wave pulses may travel uninterrupted to the transducer elements.

The bottom of the body member 11 is recessed at 16 and a bore 17 extends from the recess 16 through the nose of the target.

Secured within the recess 16 by a ring member 18 is the transducer 19. Referring now in particular to Fig. 4 the transducer 19 includes a casing 20 which is made from any suitable sound transparent material such as rubber. Within the casing 20 are disposed a plurality of stacked layers of piezo electric crystals 21 which are arranged in a pattern as shown in Fig. 5. The several layers of crystals 21 are secured in position by means of a stud bolt 22 which is threaded into an upper metallic portion 23 of the transducer 19.

Between adjacent layers of the crystals 21 are cork spacers 24 and in electrical contact with the top and bottom faces of each layer of the crystals are circular metallic plate members 25.

In order to fix the several crystals of each layer in their proper position a central hexagonal cork member 26 is provided and is bored centrally to receive the stud 22. Serving a similar function are the several triangular shaped cork spacer members 27 which are placed between adjacent crystals in each layer.

The several layers of crystals 21 are connected in parallel by means of terminal strips 28 and 29 to which are soldered the down turned tabs 30 which are formed on the metallic contact plates 25.

Because of the particular arrangement of crystals in the transducer, its sensitivity is substantially uniform in the horizontal plane.

It will be evident from Fig. 1 that the target 10 is adapted to be towed under the water by means of a towcable 31 which passes inwardly through the bore 17 and is secured against movement in the transducer assembly 19. As shown by Fig. 4, the steel strands which go to make up the cable 31 pass through and are anchored to plate member 32 which is secured by bolts 33 against a shoulder portion 34 at the right hand side of a recess 35 which is provided in the metallic part 23 of the transducer. Metallic spacers 36 and 37 along with a rubber spacer 38 which excludes water from the transducer are also carried within the recess 35 and the whole is held firmly in place by means of a threaded retaining plug 60 which is screwed into position.

The cable 31 carries a pair of conductors 39 and 40, these conductors being connected in the transducer to the piezo electric crystals and being connected at the towing vessel to a receiving and transmitting apparatus carried by the latter.

The receiving and transmitting apparatus, which is carried by the towing vessel and which is shown schematically in Fig. 6 includes a plug 41 for connecting the conductors 39 and 40 which lead from the transducer 19 into the receiver and transmitter circuits.

The receiver is a three stage unit employing two stages of R. F. amplification by means of the tubes 42, 43. The third stage includes the tube 44 which is of the duplex triode diode type which serves as the rectifier and as an audio amplifier. Tuning of the R. F. stages to provide for reception of signals from echo ranging equipments having different frequencies is obtained by means of the conjointly acting variable capacitors 45 and 46.

In order to prevent supersonic frequencies from being applied to the grid of the triode section of tube 44, we provide a single section R-C filter consisting of resistors 47, 48 and capacitor 49.

The transmitter or driver consists of a tube 50 connected in a modified Hartley circuit and the tube 51 is used as a class B driver. Tuning of the transmitter may be varied by the variable capacitor 52 to suit different frequency requirements.

The power supply may be a battery 53 which is connected through switch 54 to a vibrator pack 55 which furnishes plate voltage. A pilot lamp 56 may also be used if desired.

The transfer from reception of a signal to transmission is accomplished by the use of a tube 57, commonly referred to as a strobotron, and a relay 58 which is of the type that is quick to close but slow to open.

Operation

The body member 10 is lowered into the water and towed submerged by a surface vessel in simulation of an actual submarine and the receiver and transmitter are tuned to the frequency of the echo ranging apparatus to be used. When a pulse of wave energy projected from the transducer of the echo ranging apparatus intercepts the transducer 19 the voltage thereby induced in the crystals 21 will be amplified in the receiver. This causes the plate potential of the tube 44 to rise which in turn increases the potential on the grid of the tube 57. If the increase is sufficient, tube 57 becomes conductive, thus discharging a 1 μf condenser 59 in the plate circuit. The tube 57 will immediately extinguish itself and condenser 59 is recharged through the winding of relay 58, thus operating the contacts of this relay. The contacts will remain closed for about 1/10 of a second, during which period the transmitter is put into operation and causes a strong supersonic signal or pseudo echo to be emitted by the transducer 19 in simulation of the natural echo which would be reflected by a much larger body such as a submarine.

Since the transducer sensitivity is non-directional in a horizontal plane, the pseudo echo will be transmitted horizontally in all directions with substantially the same intensity and thus will be received and detected as an echo by the echo ranging apparatus then operating as a receiver.

In conclusion, while we have illustrated and described our preferred form of the invention, it will be evident that various changes in the structure and arrangement of parts may be made by those skilled in the art without departing from the spirit and scope of the appended claims.

For example, while we prefer to place the receiver, the transmitter, the power supply and relay in the towing vessel, any or all of such apparatus could just as well be contained in the submerged body member.

Furthermore, while we prefer to use a single transducer for both receiving the pulse and transmitting its echo, it will be evident that separate transducers for each function could be utilized.

We claim:

1. A device for use with echo ranging apparatus comprising a submersible target member, a transducer in said target member for receiving compressional wave energy from said echo ranging apparatus, means in said transducer for converting said compressional wave energy into electrical energy, a cable having a pair of conductors connected to said transducer, a receiver and a transmitter remotely disposed from said target member and adapted for installation on a ship, electrical means connecting the other end of said conductors in parallel with said receiver and transmitter whereby said receiver is responsive to electrical energy from said transducer to produce a signal pulse, time delay means connected to said receiver responsive to said signal pulse from said receiver, and means connecting said time delay means to said transmitter, whereby said transmitter emits a pseudo-echo pulse to said transducer for transmission to said echo ranging apparatus.

2. A device for use with echo ranging apparatus comprising a submersible target member, a transducer in said target member for receiving compressional wave energy from said echo ranging apparatus, means in said transducer for converting said compressional wave energy into electrical energy, a receiver connected with said transducer responsive to said electrical energy to produce a signal pulse, a transmitter connected to said receiver and transducer and responsive to said signal pulse from said receiver to produce an echo pulse, and means in said transmitter for adjusting the frequency of the echo pulse to the same frequency as the received compressional wave energy, whereby a pseudo-echo of said pulse is emitted by said transducer at the same frequency and of stronger intensity than said electrical energy initially received by said receiver.

3. A device for use with echo-ranging apparatus comprising a submersible target member, a transducer in said target member for receiving compressional wave energy from said echo ranging apparatus, means in said transducer for converting said compressional wave energy to electrical energy, a receiver connected to said transducer for receiving said electrical energy and emitting a signal pulse, a transmitter connected to said receiver and said transducer and responsive to said signal pulse for emitting an echo pulse to said transducer for transmission to said echo ranging apparatus, and means in each of said receiver and transmitter for adjusting the frequency thereof to the same frequency as the received compressional wave energy.

References Cited in the file of this patent

UNITED STATES PATENTS

| | | |
|---|---|---|
| 1,464,103 | Nash | Aug. 7, 1923 |
| 1,481,923 | Nash | Jan. 29, 1924 |
| 1,610,779 | Hewett | Dec. 14, 1926 |
| 2,009,451 | Kunze | July 30, 1935 |
| 2,138,036 | Kunze | Nov. 29, 1938 |
| 2,397,107 | Hammond | Mar. 26, 1946 |
| 2,405,239 | Seeley | Aug. 6, 1946 |
| 2,447,069 | Holcomb | Aug. 17, 1948 |
| 2,460,827 | Isely | Feb. 8, 1949 |
| 2,539,511 | Hansen et al. | Jan. 30, 1951 |